Patented July 13, 1954

2,683,400

UNITED STATES PATENT OFFICE 2,683,400

METHOD OF MAKING ACID RESISTING, MICROPOROUS MATERIAL

Frank Booth, Denton, near Manchester, England, assignor, by mesne assignments, to The British Fibrak Separator Company Limited, Denton, near Manchester, England, a corporation of Great Britain No Drawing. Application May 27, 1949, Serial No. 95,873

Claims priority, application Great Britain June 8, 1948

1 Claim. (Cl. 92—39)

This invention relates to the manufacture of an acid-resisting micro-porous material.

The main object of the invention is to provide a material which will be suitable for use, for example, as a separator for storage batteries, instead of the natural wood separators at present commonly used, and which will be more resistant to chemical action and less liable to shrink or crack on drying. Further, the process of manufacture of the sheet according to the invention enables the porosity of the sheet to be accurately determined.

The invention consists in a method of manufacturing micro-porous material suitable for use in constructing separators for a storage battery, characterised by reducing to a fine pulp in the presence of a wetting agent shredded wood digested to remove substances deleterious to the plate of a storage battery, filtering the resultant aqueous suspension of finely pulped material and forming a sheet therefrom, impregnating the sheet with a water-soluble resin capable of being polymerised to form an acid-resisting polymer, e. g. phenol formaldehyde resin, heat treating the sheet to polymerise the resin therein, dipping it in a wetting agent and finally drying the sheet.

Preferably the sheet is dried as the step precedent to impregnating the sheet with a synthetic resin and polymerising the resin.

The wetting agent is preferably added in the proportion of 0.5% by weight, but successful results have been obtained by increasing the proportion up to 5%.

The wood is first shredded and then digested with an alkali to soften and loosen its fibres, and to remove deleterious substances. Preferably digestion for 48 hours at boiling point with a four per cent solution of caustic soda is effected.

The nature of the invention will be more clearly understood from the following description of a preferred process according to the invention for making separators for storage batteries from balsa wood or other soft light wood such as Quipo or Obiche (Nigerian whitewood, *Triplochiton scleroncylon*.

The shredded material digested by a hot solution of caustic soda of 4% strength is treated to convert it into a fine pulp and a small proportion, say 0.5% of a wetting agent, wet strength, e. g. a rubber phenolic resin, is added to hold the fine pulp in suspension.

The pulping may be effected by means of an edge runner mill or a hammer pulverizing machine or a beating machine, as used in paper manufacture.

The aqueous suspension of finely pulped material thus produced is filtered under suction to form it into a sheet by a process similar to that used in paper making, and is then dried. Deformation or cracking during the drying process may be avoided by drying the sheet under pressure at a temperature a little below boiling point.

The sheet is then impregnated with a water-soluble resin, for instance a synthetic resin of the type sold under the registered trade-mark "Bakelite," which can be polymerised to form an acid-resisting polymer.

The impregnation may be effected by soaking the sheet in an aqueous solution of the resin, the strength of the solution and the time of soaking being adjusted to give the desired degree of porosity. The proportion of resin in the wet mix may vary from 10% to 5% by weight and the strength of the solution for impregnation may vary from 25% to 100%.

The sheet is then dried and heat treated to polymerise the resin, and it is then dipped into a solution of a wetting agent and finally dried.

The sheet may be grooved or given any desired form by cutting but preferably by moulding it during the heat treatment.

The formation of the sheet from the wet pulp and the subsequent drying may be carried out by machinery similar to that used in paper making, and arranged to produce a continuous strip of material, which can subsequently be cut into lengths as required. By this process a separator can be produced in which the pores are three microns in size.

A resin impregnated sheet can be produced by mixing the resin with the pulped material when this is in aqueous solution. It has, however, been found that resin is lost during the subsequent filtration and that, in consequence, the amount of resin remaining in the dried sheet, and therefore the resulting porosity of the sheet, is indeterminate.

By the above described process, the proportion of resin to pulp in the finished sheet can be accurately determined by the strength of the resin impregnating solution and the time of soaking. Consequently the porosity of the sheet can be accurately controlled in commercial manufacture, and a fineness of pores to 10 microns can be readily obtained in the finished product, in fact experiments have shown the production of material according to the invention to achieve a fineness for the pores of 3 microns.

I claim:

Method of manufacturing micro-porous material having a pore-fineness of 3–10 microns for use in constructing separators for storage batteries, which consists of the following procedural steps in the order named: digesting a soft light wood selected from the group consisting of balsa, Quipo and Obiche with a solution of 4% caustic soda at its boiling point for about 48 hours to form a fine pulp devoid of all substances deleterious to the plates of storage batteries, adding to the fine pulp 0.5 to 5.0% of a phenolic resin sufficient to hold the pulp in suspension, filtering the finely pulped material to form a sheet therefrom, drying the said sheet, impregnating the said sheet by soaking it in an aqueous solution of a phenolic formaldehyde resin which is capable of being polymerised to form an acid-resisting polymer, said aqueous solution having a concentration of at least 25%, drying the impregnated sheet, heat treating the dried sheet to polymerise the resin therein, dipping the sheet in a wetting agent, and finally redrying the sheet.

References Cited in the file of this patent

UNITED STATES PATENTS

| Number | Name | Date |
|---|---|---|
| 1,051,580 | Heap | Jan. 28, 1913 |
| 1,160,365 | Baekeland | Nov. 16, 1915 |
| 1,415,683 | Nordyke | May 9, 1922 |
| 1,679,441 | Nanji | Aug. 7, 1928 |
| 1,690,573 | Fallek | Nov. 7, 1928 |
| 1,802,984 | Richter | Apr. 28, 1931 |
| 1,986,291 | Schur | Jan. 1, 1935 |
| 2,048,775 | Bolton | July 28, 1936 |
| 2,072,487 | Snyder | Mar. 2, 1937 |
| 2,247,204 | Schorger et al. | June 24, 1941 |
| 2,247,208 | Schorger | June 24, 1941 |
| 2,292,389 | Meiler | Aug. 11, 1942 |
| 2,314,203 | Fairclough | Mar. 16, 1943 |
| 2,325,302 | Britt | July 27, 1943 |
| 2,331,935 | Schlosser et al. | Oct. 19, 1943 |
| 2,387,683 | Richter et al. | Oct. 23, 1945 |
| 2,482,062 | Hanson | Sept. 13, 1949 |
| 2,508,043 | Schaefer | May 16, 1950 |
| 2,543,137 | Uber | Feb. 27, 1951 |

FOREIGN PATENTS

| Number | Country | Date |
|---|---|---|
| 280,262 | Great Britain | Nov. 15, 1927 |

OTHER REFERENCES

Collins: Paper Ind. and Paper World, June 1943, pp. 263–269.

Paper Ind. and Paper World, February 1947, p. 1643.

Boehm: Paper Trade J., May 2, 1940, pages 35–38.